(12) United States Patent
Liu

(10) Patent No.: US 11,890,827 B2
(45) Date of Patent: Feb. 6, 2024

(54) TOFU PRESS

(71) Applicant: Meijuan Liu, Shanghai (CN)

(72) Inventor: Meijuan Liu, Shanghai (CN)

( * ) Notice: Subject to any disclaimer, the term of this patent is extended or adjusted under 35 U.S.C. 154(b) by 535 days.

(21) Appl. No.: 17/187,890

(22) Filed: Mar. 1, 2021

(65) Prior Publication Data

US 2021/0402723 A1  Dec. 30, 2021

(30) Foreign Application Priority Data

Jun. 30, 2020 (CN) .......................... 202021248456.7

(51) Int. Cl.
*B30B 9/06* (2006.01)
*A23L 11/45* (2021.01)
*A23P 30/10* (2016.01)

(52) U.S. Cl.
CPC ................ *B30B 9/06* (2013.01); *A23L 11/45* (2021.01); *A23P 30/10* (2016.08); *A23V 2002/00* (2013.01)

(58) Field of Classification Search
CPC ... B30B 9/06; B30B 1/20; A23P 30/10; A23L 11/07; A23L 11/45; A23V 2002/00
See application file for complete search history.

(56) References Cited

U.S. PATENT DOCUMENTS

| | | | | |
|---|---|---|---|---|
| 1,408,450 | A * | 3/1922 | Gilson | B30B 15/04 100/214 |
| 6,672,204 | B2 * | 1/2004 | Fiorello | A47J 36/08 99/506 |
| 7,775,157 | B2 * | 8/2010 | Kraft | A23L 11/45 99/507 |
| 10,717,249 | B1 * | 7/2020 | Kim | A23P 30/10 |
| 2017/0318856 | A1 * | 11/2017 | Kittow | A23P 30/10 |

FOREIGN PATENT DOCUMENTS

CN  107156770 A * 9/2017 ............. A23L 27/22

* cited by examiner

*Primary Examiner* — Jimmy T Nguyen
(74) *Attorney, Agent, or Firm* — Bayramoglu Law Offices LLC

(57) ABSTRACT

A tofu press includes: an open container, a foldable plate, a pressing plate, a spring assembly, and an end cover, where the foldable plate is configured to be placed at a bottom of the open container, the foldable plate includes a bottom plate and lateral plates disposed at two sides of the bottom plate, the lateral plates are perpendicular to and connected to the bottom plate, the pressing plate is configured to cover and press a top of the bottom plate, a bottom end of the spring assembly is configured to press the pressing plate, and the spring assembly is fixedly connected to the end cover; and the pressing plate, the lateral plates, the bottom plate, and two faces of the open container form a compression operating area. The tofu press ensures uniform pressing at the time of pressing a food material to dehydrate.

10 Claims, 3 Drawing Sheets

TOFU PRESS

CROSS REFERENCE TO THE RELATED APPLICATIONS

This application is based upon and claims priority to Chinese Patent Application No. 202021248456.7, filed on Jun. 30, 2020, the disclosure of which is incorporated herein by reference in its entirety.

TECHNICAL FIELD

The present invention relates to the field of food material dehydration, and in particular, to a tofu press.

BACKGROUND

In a tofu production process, a very important step is to place tofu pudding in a mold, press the tofu pudding, dehydrate the tofu pudding, and shape the tofu pudding into lumpy tofu. Even, superfluous moisture usually needs to be removed from finished tofu, so that the tofu is not easy to deform or crack, but is easier to fry and easier to be tasty. A conventional dehydration manner is to place tofu wrapped with gauze in a container, and press the tofu by placing a heavy object on the tofu. As a result, the force applied to the tofu is not uniform and the magnitude of the applied force is not controllable. Finally, the tofu is consequently not uniform in density or even cracks. Moreover, the process of taking tofu out and placing it into a container is not sufficiently convenient or speedy, increasing a risk of damaging the tofu in a taking or placing process.

SUMMARY

In view of the foregoing problem, the present invention provides a tofu press, which is not only convenient to take or place tofu, but also presses the tofu uniformly and can adjust an applied pressure according to the tofu size.

To achieve the foregoing objective, the present invention adopts the following technical solutions:

A tofu press is provided, including: an open container, a foldable plate, a pressing plate, a spring assembly, and an end cover, where the foldable plate is configured to be placed at the bottom of the open container, the foldable plate includes a bottom plate and lateral plates disposed at two sides of the bottom plate, the lateral plates are perpendicular to and connected to the bottom plate, the pressing plate is configured to cover and press the top of the bottom plate, a bottom end of the spring assembly is configured to press the pressing plate, and the spring assembly is fixedly connected to the end cover; and the pressing plate, the lateral plates, the bottom plate, and two faces of the open container form a compression operating area.

Preferably, the spring assembly includes a compression spring, a spring sleeve, a male-threaded nut, and a rotary knob, the spring sleeve is connected to the male-threaded nut through a lock cover, the compression spring disposed inside the spring sleeve and the male-threaded nut, a top end of the compression spring is fixedly connected to a top end of the male-threaded nut, and a bottom end of the compression spring is fixedly connected to a bottom end of the spring sleeve; and the end cover is provided with a through-hole matching the male-threaded nut, the male-threaded nut is fixedly connected to the end cover through the through-hole, the rotary knob includes a holding end and a rotation end, the holding end and the rotation end are "T"-shaped, the rotation end is configured to be inserted into the male-threaded nut and the compression spring, and the rotation end is configured to drive the male-threaded nut to rotate.

An optimization effect brought by this optimization solution is as follows: The pressure applied by the spring assembly to the pressing plate can be adjusted through the rotary knob, the distance between the pressing plate and the bottom plate can be changed, the applied pressure can be adjusted according to the tofu size, and the pressing is uniform.

More preferably, a silica gel ring is sleeved on the holding end.

Preferably, the end cover is connected to the open container through a snap joint.

Preferably, the end cover is provided with a water pouring hole.

An optimization effect brought by this optimization solution is as follows: Storage liquid can be poured out without opening the end cover, to make it convenient to operate, and pouring water without opening the end cover in the water pouring process prevents a food material being pressed from losing the pressure and rebounding.

Preferably, the bottom plate is connected to the lateral plates through shafts, the lateral plates are rotatable around positions of connection to the bottom plate, the positions of connection are provided with limiting plates, and the limiting plates are configured to fix the lateral plates to cause the lateral plates to be perpendicular to the bottom plate.

An optimization effect brought by this optimization solution is as follows: The foldable plate can be flattened to make it convenient to take a food material from or place a food material onto the bottom plate, and can act as a temporary chopping board.

Preferably, the bottom plate is provided with a water passage hole, and the outside of the foldable plate and an inner wall of the open container form a storage liquid space.

Preferably, a bottom end outside the open container is provided with a foot mat.

An optimization effect brought by this optimization solution is as follows: The foot mat can increase the friction, to play an anti-skidding role.

Preferably, four sides of the open container are made of a transparent material, and are marked with scales.

More preferably, the lateral plates are provided with handholds.

Compared with the prior art, the present invention has the following beneficial effects:

1. The tofu press according to the present invention has a simple and efficient structure, can ensure uniform pressing at the time of pressing a food material to dehydrate, and can adjust the pressing intensity according to food materials.

2. The tofu press according to the present invention can store moisture obtained by pressing a food material, to make it convenient to perform subsequent treatment and processing, and avoid a conventional case that tofu water is wasted and moisture is difficult to clean when tofu is pressed.

3. In the tofu press according to the present invention, the foldable plate is designed to make it extremely convenient to take or place a food material, the bottom plate and the lateral plates are in two states, namely, a flattened state and a perpendicular state, and the tofu press is flexibly applicable to taking or placing of various food materials, so that the tofu press is not only applicable to dehydration of tofu, but also applicable to pressing dehydration of other food materials.

In the figures: 1, open container; 2, foldable plate, 21, bottom plate, 22, lateral plates, 23, rotation shaft, 24, limiting plate; 3, pressing plate; 4, end cover; 5, compression spring; 6, spring sleeve; 7, male-threaded nut; 8, rotary knob, 81, holding end, 82, rotation end; 9, through-hole; 10, lock cover; 11, silica gel ring; 12, water pouring hole; 13, snap joint; 14, water passage hole; 15, supporting foot; 16, handhold; 17, foot mat; 18, water hole.

DETAILED DESCRIPTION OF THE EMBODIMENTS

To better understand the present invention, content of the present invention is further clarified below with reference to accompanying drawings and embodiments, but the present invention is not merely limited to the following embodiments.

Embodiments

In the description of the present invention, it should be understood that orientation or position relationships indicated by "on", "below", "top", "bottom", "inside", and "outside" are all based on orientation or position relationships shown in the accompanying drawings, and are used only for ease and brevity of illustration and description, rather than indicating or implying that the mentioned component needs to have a particular orientation or needs to be constructed and operated in a particular orientation. Therefore, such orientation or position relationships should not be construed as limiting of the present invention.

Figure 1:
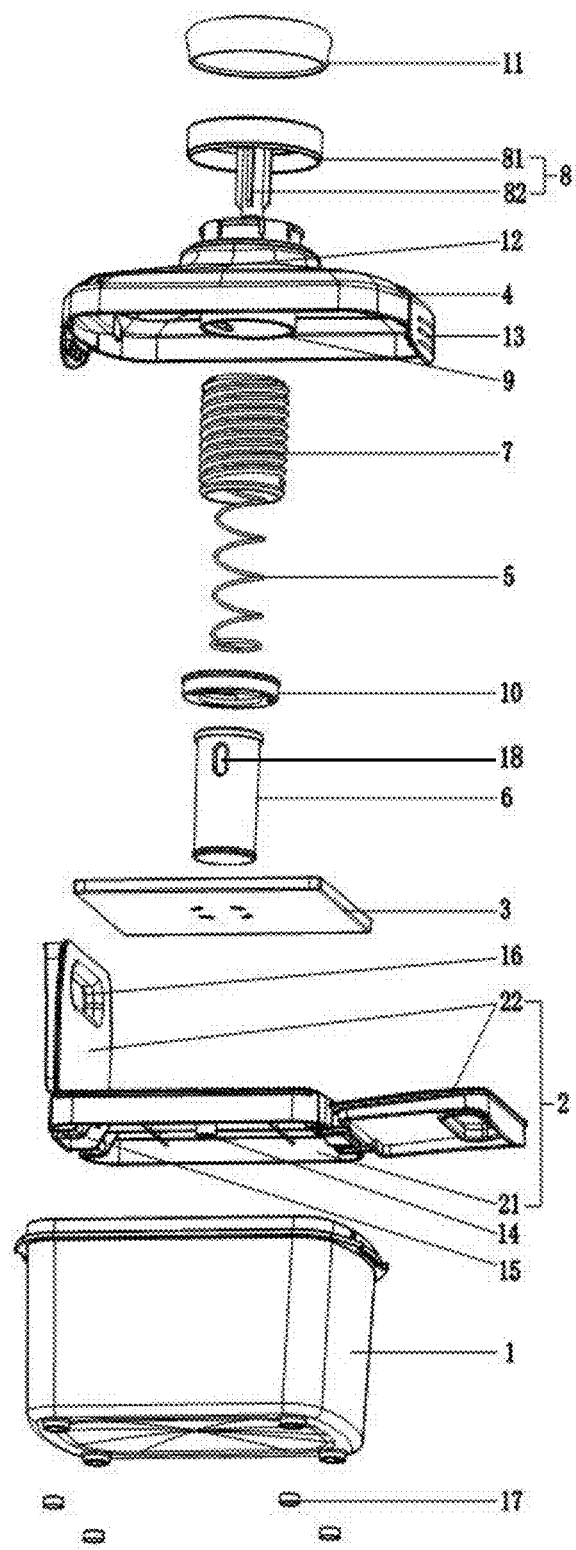
FIG. 1 is an exploded structural diagram of a tofu press according to the present invention.
Figure 2:
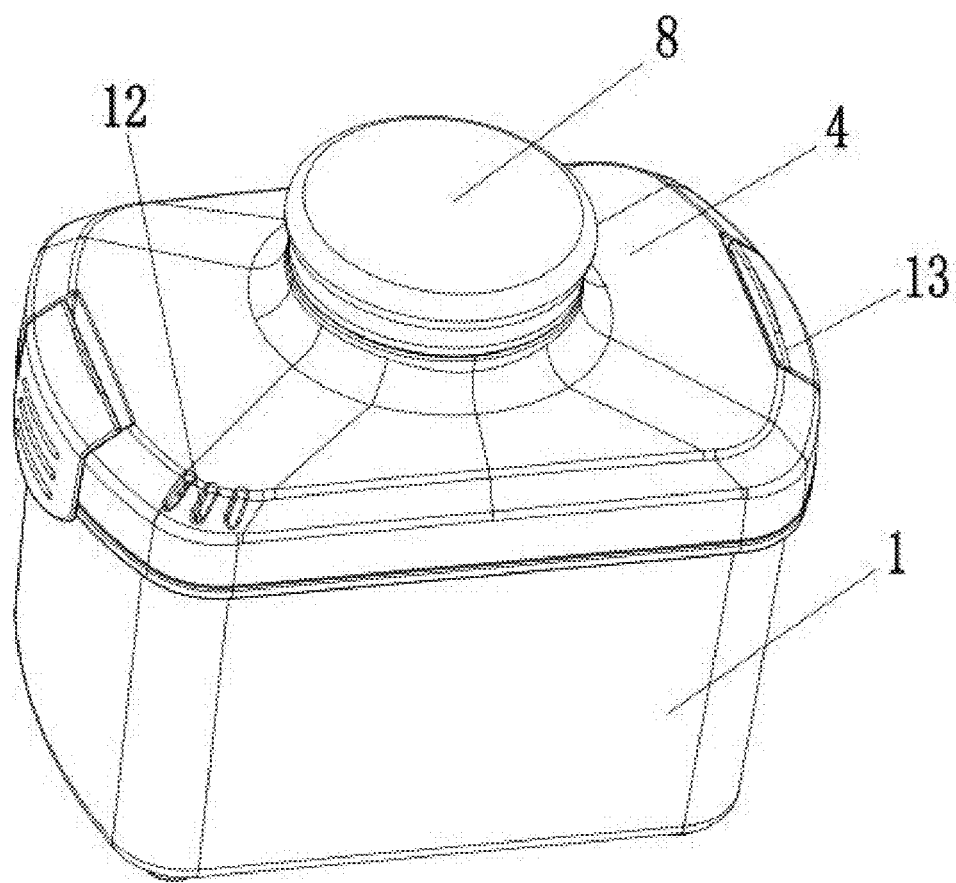
FIG. 2 is a schematic structural diagram of a tofu press according to the present invention.
Figure 3:
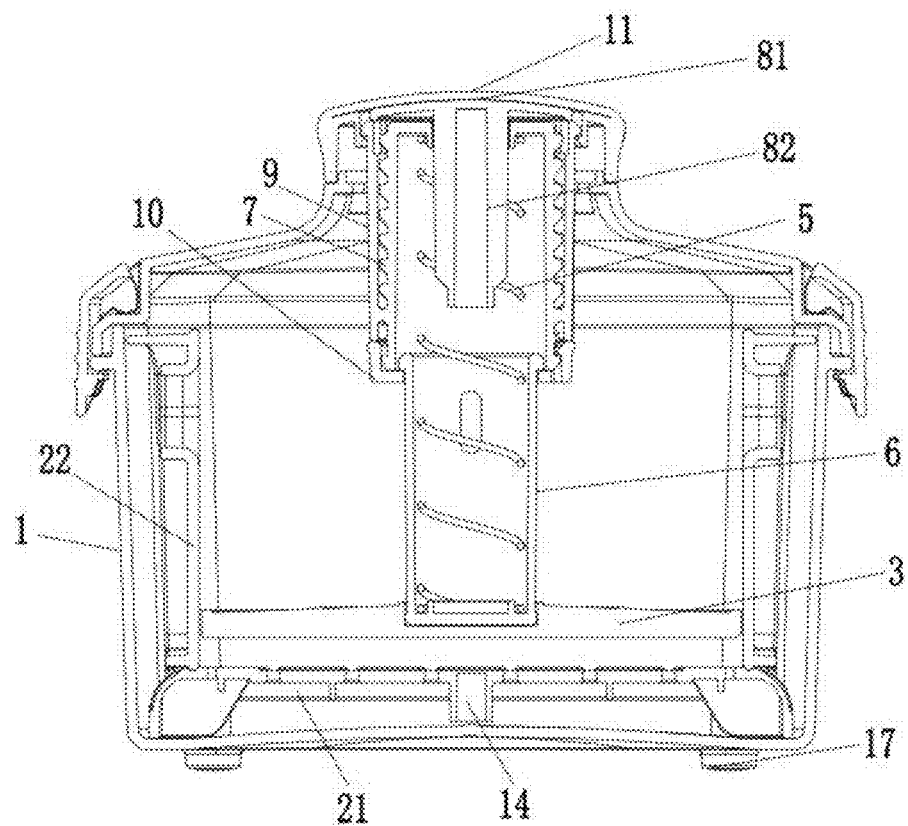
FIG. 3 is a cross-sectional view of a central vertical face in FIG. 2.

As shown in FIG. 1 to FIG. 3, a tofu press is provided, including: an open container 1, a foldable plate 2, a pressing plate 3, a spring assembly, and an end cover 4. The foldable plate 2 is configured to be placed at the bottom of the open container 1, the foldable plate 2 includes a bottom plate 21 and lateral plates 22 disposed at two sides of the bottom plate 21, the lateral plates 22 are perpendicular to and connected to the bottom plate 21, the pressing plate 3 is configured to cover and press the top of the bottom plate 21, a bottom end of the spring assembly is configured to press the pressing plate 3, and the spring assembly is fixedly connected to the end cover 4. The pressing plate 3, the lateral plates 22, the bottom plate 21, and two faces of the open container 1 form a compression operating area.

The spring assembly includes a compression spring 5, a spring sleeve 6, a male-threaded nut 7, and a rotary knob 8. The spring sleeve 6 is connected to the male-threaded nut 7 through a lock cover 10, the compression spring 5 is disposed inside the spring sleeve 6 and the male-threaded nut 7, a top end of the compression spring 5 is fixedly connected to a top end of the male-threaded nut 7, and a bottom end of the compression spring 5 is fixedly connected to a bottom end of the spring sleeve 6. The end cover 4 is provided with a through-hole 9 matching the male-threaded nut 7, and the male-threaded nut 7 is fixedly connected to the end cover 4 through the through-hole 9. The rotary knob 8 includes a holding end 81 and a rotation end 82, the holding end 81 and the rotation end 82 are "T"-shaped, the rotation end 82 is configured to be inserted into the male-threaded nut 7 and the compression spring 5, and the rotation end 82 is configured to drive the male-threaded nut 7 to rotate. The male-threaded nut 7 and the compression spring 5 can have a dual role by rotating the rotary knob 8, to change the intensity of pressing the pressing plate 3 and the distance between the pressing plate 3 and the bottom plate 21. For the purpose of smooth pressing, the cross-sectional area of the pressing plate 3 is actually less than the cross-sectional area of the bottom plate 21 that is less than the cross-sectional area of the open container 1 at the bottom. To make it convenient to clean the spring assembly, the spring sleeve 6 may be provided with a water hole 18.

To make it convenient to rotate the rotary knob 8, a silica gel ring 11 is sleeved on the holding end 81, which can increase friction and comfort of holding. The end cover 4 is connected to the open container 1 through a snap joint 13.

The end cover 4 is provided with a water pouring hole 12, so that storage liquid can be poured out without opening the end cover 4, to make it convenient to operate, and pouring water without opening the end cover in the water pouring process prevents a food material being pressed from losing the pressure and rebounding.

Figure 4:
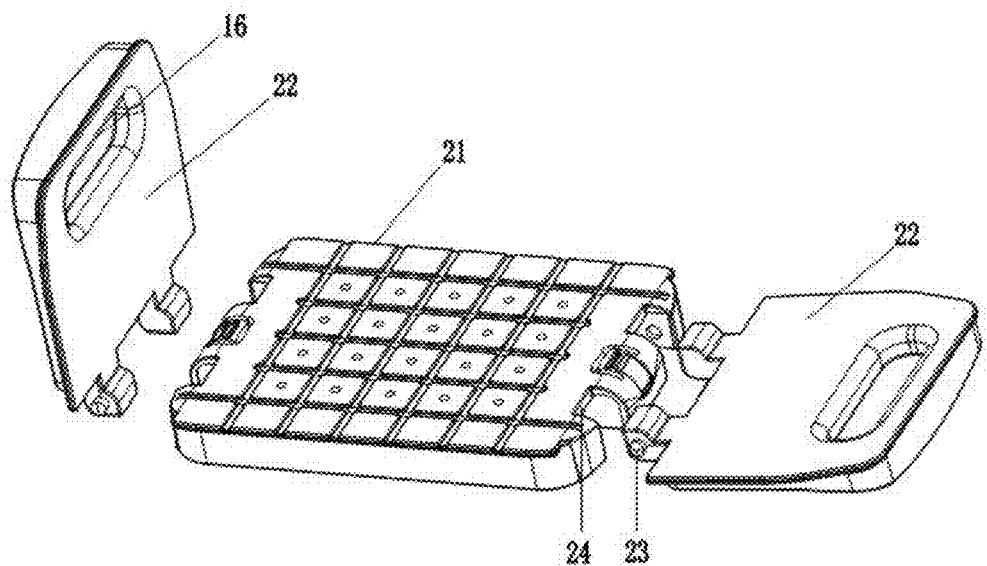
FIG. 4 is a schematic structural diagram of a foldable plate according to the present invention.

As shown in FIG. 4, the bottom plate 21 and the lateral plates 22 of the foldable plate 2 are connected through rotation shafts, the lateral plates 22 can perform damping rotation around positions of connection to the bottom plate 21, the positions of connection are provided with limiting plates, and the limiting plates are configured to cause the lateral plates 22 to be perpendicular to the bottom plate 21, so that when pressing needs to be performed, the bottom plate 21 stays perpendicular to the lateral plates 22. When a food material is taken or placed, the foldable plate 2 can be taken out, and the lateral plates 22 are rotated, so that the lateral plates 22 are flattened, and the lateral plates and the bottom plate 21 are located on the same plane, to make it convenient to take or place the food material, or act as a chopping board. The lateral plates 22 are provided with handholds 16, to make it convenient to take or place the foldable plate.

The bottom plate 21 is provided with a water passage hole 14, make it convenient to export moisture through the water passage hole 14 in a process of pressing a food material, a bottom end inside the open container 1 is provided with a supporting foot 15, and the supporting foot is configured to support raising of the bottom plate 21, so that some space is reserved between the bottom plate 21 and the bottom end inside the open container 1, and the outside of the foldable plate 2 and an inner wall of the open container 1 form a storage liquid space used for temporarily storing the exported moisture.

Four sides of the open container 1 are made of a transparent material, and are marked with scales, to make it convenient to view the height of the pressed food material. A bottom end outside the open container 1 can be provided with a foot mat 17, to play an anti-skidding role.

A method for using the tofu press according to the present invention is as follows:

A food material is placed onto the bottom plate 21: The foldable plate 2 is first taken out, a food material such as tofu pudding is placed onto the bottom plate 21, the lateral plates 22 can be selectively flattened in a placement process, to make the placement more convenient, then the lateral plates 22 and the bottom plate 21 are fixed perpendicular to each other, and the foldable plate 2 is placed into the open container. Alternatively, the foldable plate 2 in which the lateral plates 22 and the bottom plate 21 are fixed perpendicular to each other is first placed into the open container 1, and then a food material is placed.

The pressing plate 3 performs pressing: The pressing plate 3 is laid flat on the food material, the end cover 4 is closed, and the rotary knob 8 is rotated to adjust the magnitude of the pressure of the pressing plate 3, so that the pressing plate 3 applies a specific pressure to press the food material. After the food material is shaped, the end cover 4 is opened, to take out the food material.

Although the embodiments of the present invention are already shown and described, a person of ordinary skill in the art may understand that various changes, modifications, replacements and variations may be made to the embodiments without departing from the principles and spirit of the present invention, and the scope of the present invention is as defined by the appended claims and their equivalents.

What is claimed is:

1. A tofu press, comprising:
an open container, a foldable plate, a pressing plate, a spring assembly, and an end cover, wherein the foldable plate is configured to be placed at a bottom of the open container, the foldable plate comprises a bottom plate and lateral plates disposed at two sides of the bottom plate, the lateral plates are perpendicular to the bottom plate and the lateral plates are pivotally connected to the bottom plate, the pressing plate is configured to cover and press a top of the bottom plate, a bottom end of the spring assembly is configured to press the pressing plate, and the spring assembly is fixedly connected to the end cover; and
the pressing plate, the lateral plates, the bottom plate, and two opposite inner faces of sidewalls of the open container form a compression operating area.

2. The tofu press according to claim 1, wherein the spring assembly comprises a compression spring, a spring sleeve, a male-threaded nut, and a rotary knob, wherein the spring sleeve is connected to the male-threaded nut through a lock cover, the compression spring is disposed inside the spring sleeve and the male-threaded nut, a top end of the compression spring is fixedly connected to a top end of the male-threaded nut, and a bottom end of the compression spring is fixedly connected to a bottom end of the spring sleeve; and
the end cover is provided with a through-hole matching the male-threaded nut, the male-threaded nut is fixedly connected to the end cover through the through-hole, the rotary knob comprises a holding end and a rotation end, the holding end and the rotation end are "T"-shaped, the rotation end is configured to be inserted into the male-threaded nut and the compression spring, and the rotation end is configured to drive the male-threaded nut to rotate.

3. The tofu press according to claim 2, wherein a silica gel ring is sleeved on the holding end.

4. The tofu press according to claim 1, wherein the end cover is connected to the open container through a snap joint.

5. The tofu press according to claim 1, wherein the end cover is provided with a water pouring hole.

6. The tofu press according to claim 1, wherein the bottom plate is connected to the lateral plates through shafts, the lateral plates are rotatable around positions of connection to the bottom plate, wherein the positions of connection are provided with limiting plates, and the limiting plates are configured to cause the lateral plates to be perpendicular to the bottom plate.

7. The tofu press according to claim 1, wherein the bottom plate is provided with a water passage hole, and an outside of the foldable plate and an inner wall of the open container form a storage liquid space.

8. The tofu press according to claim 1, wherein a bottom end outside the open container is provided with a foot mat.

9. The tofu press according to claim 1, wherein four sides of the open container are made of a transparent material, and the four sides of the open container are marked with scales.

10. The tofu press according to claim 1, wherein the lateral plates are provided with handholds.

* * * * *